United States Patent
Huang

(10) Patent No.: US 9,351,174 B2
(45) Date of Patent: May 24, 2016

(54) METHOD AND SYSTEM FOR ACQUIRING LOCATION INFORMATION

(71) Applicant: Tencent Technology (Shenzhen) Company Limited, Shenzhen, Guangdong Province (CN)

(72) Inventor: Tieming Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 255 days.

(21) Appl. No.: 13/902,022

(22) Filed: May 24, 2013

(65) Prior Publication Data

US 2014/0066095 A1    Mar. 6, 2014

(30) Foreign Application Priority Data

Sep. 6, 2012    (CN) .......................... 2012 1 0327380

(51) Int. Cl.
*H04W 24/00* (2009.01)
*H04W 4/18* (2009.01)
(Continued)

(52) U.S. Cl.
CPC ............ *H04W 24/00* (2013.01); *G01S 5/0027* (2013.01); *G01S 5/0072* (2013.01); *G06F 17/3087* (2013.01); *H04W 4/18* (2013.01); *H04W 4/04* (2013.01)

(58) Field of Classification Search
USPC .......... 455/456.1, 456.2, 456.3, 456.4, 456.5, 455/456.6, 457
See application file for complete search history.

(56) References Cited

U.S. PATENT DOCUMENTS

2005/0140507 A1    6/2005  Nam et al.
2009/0258656 A1*  10/2009  Wang et al. ................. 455/456.1
(Continued)

FOREIGN PATENT DOCUMENTS

CN    101374249 A    2/2009
CN    201242811 Y    5/2009
(Continued)

OTHER PUBLICATIONS

Tencent Technology, IPRP, PCT/CN2013/076141, Mar. 10, 2015, 6 pgs.

*Primary Examiner* — Vladimir Magloire
*Assistant Examiner* — Sayed T Zewari
(74) *Attorney, Agent, or Firm* — Morgan, Lewis & Bockius LLP

(57) ABSTRACT

The present invention provides a method and a system for acquiring location information. The method includes: generating a positioning instruction according to a wireless positioning request initiated by a first client, and pushing the positioning instruction to a wireless communication client; receiving location information obtained when the wireless communication client performs positioning according to the positioning instruction; and sending the location information to the first client. The system includes: a request processing module, configured to generate a positioning instruction according to a wireless positioning request initiated by a first client, and push the positioning instruction to a wireless communication client; a receiving module, configured to receive location information obtained when the wireless communication client performs positioning according to the positioning instruction; and an information sending module, configured to send the location information to the first client. The accuracy can be improved by adopting the present invention.

15 Claims, 14 Drawing Sheets

(51) Int. Cl.
*G01S 5/00* (2006.01)
*G06F 17/30* (2006.01)
*H04W 4/04* (2009.01)

(56) References Cited

U.S. PATENT DOCUMENTS

2011/0169692 A1* 7/2011 Macfarlane et al. ..... 342/357.52
2012/0315924 A1* 12/2012 Park et al. ................. 455/456.3

FOREIGN PATENT DOCUMENTS

| | | |
|---|---|---|
| CN | 101521846 A | 9/2009 |
| CN | 101841764 A | 9/2010 |
| CN | 102158801 A | 8/2011 |
| JP | 2012105094 A | 5/2012 |
| WO | WO 2008157841 A1 | 12/2008 |

* cited by examiner

METHOD AND SYSTEM FOR ACQUIRING LOCATION INFORMATION

RELATED APPLICATION

This application claims priority to Chinese Patent Application No. 201210327380.0, entitled "METHOD AND SYSTEM FOR ACQUIRING LOCATION INFORMATION," filed on Sep. 6, 2012, which is incorporated by reference in its entirety.

TECHNICAL FIELD

The disclosed implementations relate generally to Internet technologies, and in particular, to a method and a system for acquiring location information.

BACKGROUND

With the development of Internet applications, when a user accesses a Web site to request for acquiring various kinds of network information, location information corresponding to the user usually needs to be obtained, so as to provide network information for the user according to the location information. A conventional method for acquiring the location information is that, by initiating a location acquisition request to a browser in the Web site, the browser performs positioning according to the current network address to obtain corresponding location information.

However, the implementation of the method for acquiring the location information must depend on the network address provided by the browser, so as to generate the location information according to correspondence between the network address and the geographic location stored in a database. But, errors often occur in the location information obtained according to the correspondence between the network address and the geographic location, and the location information can only be accurate to the city corresponding to the network address; therefore, a defect of low accuracy exists.

SUMMARY

Accordingly, a method for acquiring location information is provided to improve the accuracy.

In addition, a system for acquiring location information also needs to be provided to improve the accuracy.

In accordance with some implementations, a method for providing location-based information is performed at a server having one or more processors and memory. The server receives a search request from a client device, the search request including one or more search keywords. Then server then identifies a user account identifier associated with the search request and determines location information of a mobile device associated with the user account identifier and located near the client device. Finally, the server identifies a plurality of search results in accordance with the search keywords and the location information and returns the plurality of search results to the client device for display.

In accordance with some embodiments, a server system for providing location-based information includes one or more processors; memory; and one or more program modules stored in the memory and to be executed by the one or more processors, the program modules including instructions for: receiving a search request from a client device, the search request including one or more search keywords; identifying a user account identifier associated with the search request; determining location information of a mobile device associated with the user account identifier, wherein the mobile device is located near the client device; identifying a plurality of search results in accordance with the search keywords and the location information; and returning the plurality of search results to the client device for display.

In accordance with some implementations, a method for receiving location-based information is performed at a client device having one or more processors and memory. The client device sends a search request to a remote server, the search request including one or more search keywords, and receives a plurality of search results from the remote server. In some implementations, the search results are ordered by first location information of the client device. The client device determines second location information of the client device based on location information of a mobile device located near the client device, reorders the plurality of search results by the second location information, and displays at least a subset of the reordered search results on the client device.

A method for acquiring location information includes the following steps:

generating a positioning instruction according to a wireless positioning request initiated by a first client, and pushing the positioning instruction to a wireless communication client;

receiving location information obtained when the wireless communication client performs positioning according to the positioning instruction; and sending the location information to the first client.

A system for acquiring location information includes:

a request processing module, configured to generate a positioning instruction according to a wireless positioning request initiated by a first client, and push the positioning instruction to a wireless communication client;

a receiving module, configured to receive location information obtained when the wireless communication client performs positioning according to the positioning instruction; and an information sending module, configured to send the location information to the first client.

In the method and the system for acquiring location information, the positioning instruction is generated according to the wireless positioning request initiated in the first client, so that the wireless communication client performs positioning to obtain the location information after receiving the pushed positioning instruction, and the geographic location of the user can be known according to the location information. Because the location information is obtained through the positioning of the wireless communication client, the accuracy thereof is much higher than that of the location information obtained according to the network address, thereby greatly improving the accuracy.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
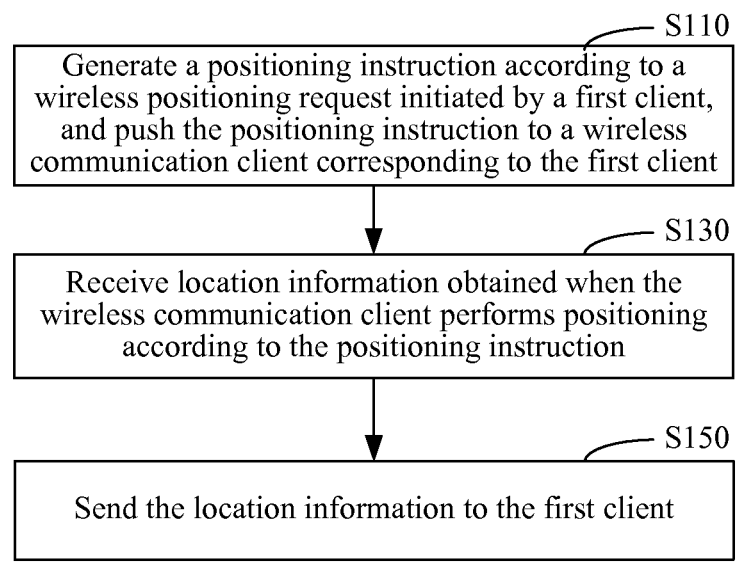
FIG. 1 is a flow chart of a method for acquiring location information according to an embodiment.

As shown in FIG. 1, in an embodiment, a method for acquiring location information includes the following steps.

Step S110: Generate a positioning instruction according to a wireless positioning request initiated by a first client, and push the positioning instruction to a wireless communication client corresponding to the first client.

In this embodiment, the first client is a client running in a fixed network terminal, and performs positioning through a network address. The fixed network terminal is a device, such as a personal computer (PC), which implements network connection through a medium such as an optical fiber or a network cable. The first client may be a browser. The wireless communication client corresponding to the first client runs in a mobile terminal, and is a client having a wireless transceiving communication function, such as a smart phone.

The wireless positioning request initiated by the first client is received. In this case, it may be known according to the wireless positioning request that the first client requests for positioning through the wireless communication client, to generate the corresponding wireless positioning instruction, and actively sends the wireless positioning instruction to the wireless communication client.

Figure 2:
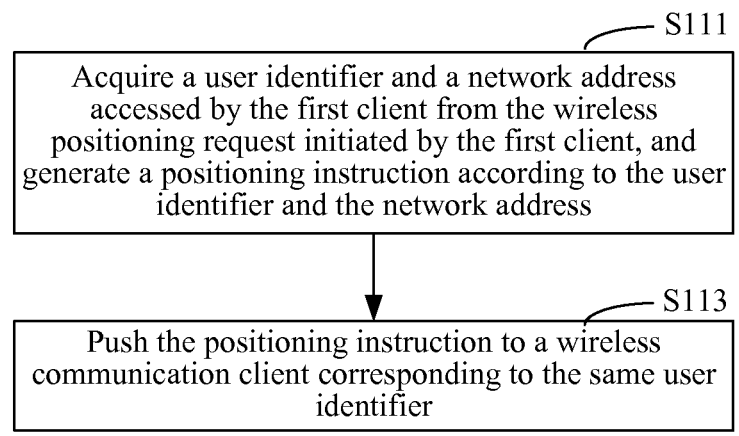
FIG. 2 is a flow chart of a method for generating a positioning instruction according to a wireless positioning request initiated by a first client, and pushing the positioning instruction to a wireless communication client in FIG. 1.

As shown in FIG. 2, in an embodiment, a specific process of Step S110 includes the following steps.

Step S111: Acquire a user identifier and a network address accessed by the first client from the wireless positioning request initiated by the first client, and generate a positioning instruction according to the user identifier and the network address.

In this embodiment, the user identifier is used for uniquely identifying a user identity in the first client and the wireless communication client. The first client and the wireless communication client adopt a same user account system. The network address accessed by the first client is a storage address corresponding to page data loaded in the running first client, namely an IP address. The first client acquires the page data from a network server through the network address and loads the page data.

Step S113: Push the positioning instruction to a wireless communication client corresponding to the same user identifier.

In this embodiment, the positioning instruction is transmitted actively, so as to push the positioning instruction to a wireless communication terminal in which a user identifier is the same as the user identifier in the first client. Specifically, the user identifier corresponding to the first client initiating the wireless positioning request may be known according to the positioning instruction, so as to push the positioning instruction according to the user identifier.

Figure 3:
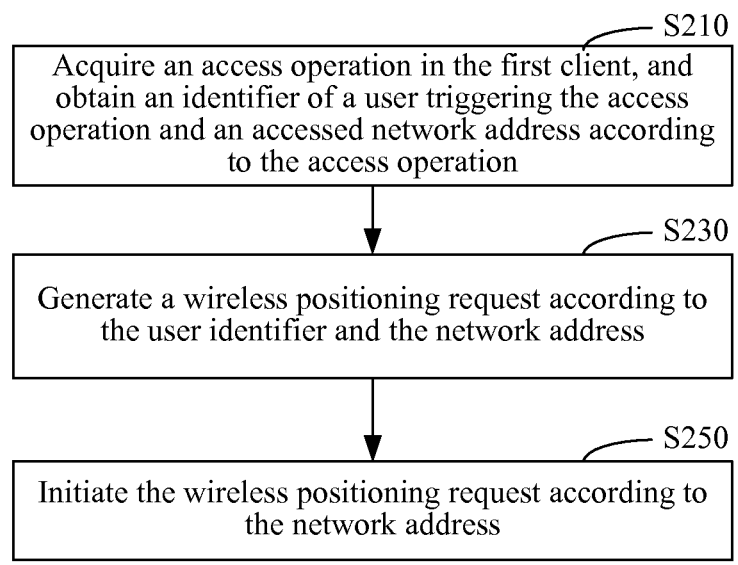
FIG. 3 is a flow chart of a method for acquiring location information according to another embodiment.

As shown in FIG. 3, in another embodiment, before Step S110, the method further includes the following steps.

Step S210: Acquire an access operation in the first client, and obtain an identifier of a user triggering the access operation and an accessed network address according to the access operation.

In this embodiment, the access operation is a page access operation triggered by a user in the first client. For example, the user may acquire a user identifier corresponding to the user and a network address of a web page by accessing the web page in the first client.

Step S230: Generate a wireless positioning request according to the user identifier and the network address.

Step S250: Initiate the wireless positioning request according to the network address.

In this embodiment, the wireless positioning request is initiated to the network server storing the page data according to the network address, so as to request the network server to acquire location information of the user.

Step S130: Receive location information obtained when the wireless communication client performs positioning according to the positioning instruction.

In this embodiment, after the positioning instruction is pushed to the wireless communication client, the wireless communication client is triggered to perform positioning through wireless transceiving communication so as to obtain a current geographic location of the wireless communication client, generate corresponding location information and upload the location information to the network server.

Figure 4:
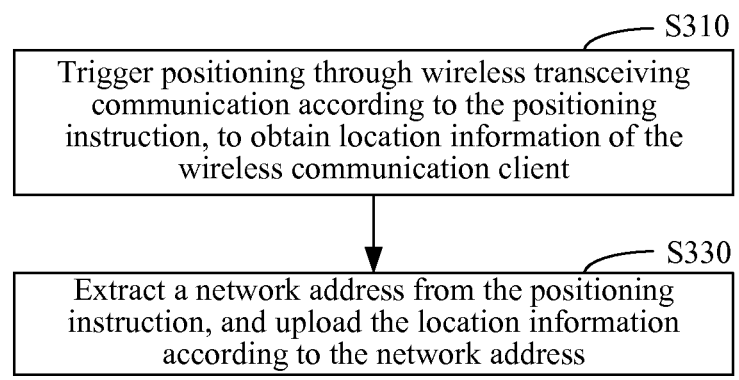
FIG. 4 is a flow chart of a method for acquiring location information according to another embodiment.

As shown in FIG. 4, in an embodiment, before Step S130, the method further includes the following steps.

Step S310: Trigger positioning through wireless transceiving communication according to the positioning instruction, to obtain location information of the wireless communication client.

In this embodiment, the wireless transceiving communication function in the wireless communication client may be implemented through a global positioning system (GPS) or a radio communication network of a communication operator. After receiving the positioning instruction, the wireless communication client performs positioning through wireless transceiving communication to obtain the current geographic location, where the geographic location may include longitude and latitude in a coordinate format.

Step S330: Extract a network address from the positioning instruction, and upload the location information according to the network address.

In this embodiment, after the location information of the wireless communication client is obtained through positioning, the network address is extracted from the positioning instruction including the user identifier and the network address, so as to upload the location information to the network server according to the network address.

Step S150: Send the location information to the first client.

In this embodiment, when receiving the location information obtained through positioning of the wireless communication terminal, the network server returns the location information to the first client initiating the wireless positioning request, so that the user can view the location information conveniently.

In the method for acquiring location information, in a scenario where the user needs to acquire the current geographic location of the first client, the accurate location information can be obtained through positioning of the wireless communication terminal. For example, in a conventional scenario of querying the location of the user through the network address, the positioning instruction may be generated through the wireless positioning request initiated in the first client; and the network server pushes the positioning instruction to the wireless communication client corresponding to the first client, to further trigger the wireless communication client to perform positioning to obtain the location information, and returns the location information to the first client, so as to display a corresponding query result to the user. Therefore, the query result is accurate to longitude and latitude, which greatly improves the accuracy of the query.

Figure 5:
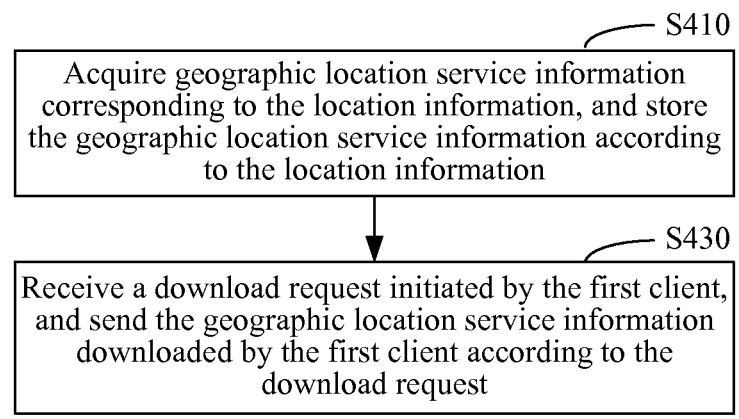
FIG. 5 is a flow chart of a method for acquiring location information according to another embodiment.

As shown in FIG. 5, in another embodiment, after Step S130, the method further includes the following steps.

Step S410: Acquire geographic location service information corresponding to the location information, and store the geographic location service information according to the location information.

In this embodiment, the geographic location service information related to the location information is obtained by querying network information according to the location information, and the geographic location service information and the location information are stored associatively, so that the user can conveniently request for accessing the geographic location service information of the location of the user.

Step S430: Receive a download request initiated by the first client, and send the geographic location service information downloaded by the first client according to the download request.

In this embodiment, the user may trigger a download operation of the geographic location service information through the first client. In this case, the first client initiates a download request to the network server storing the location information and the associative geographic location service information. After receiving the download request, the network server sends the geographic location service information to a computer, so that the user can view the geographic location service information conveniently.

Figure 6:
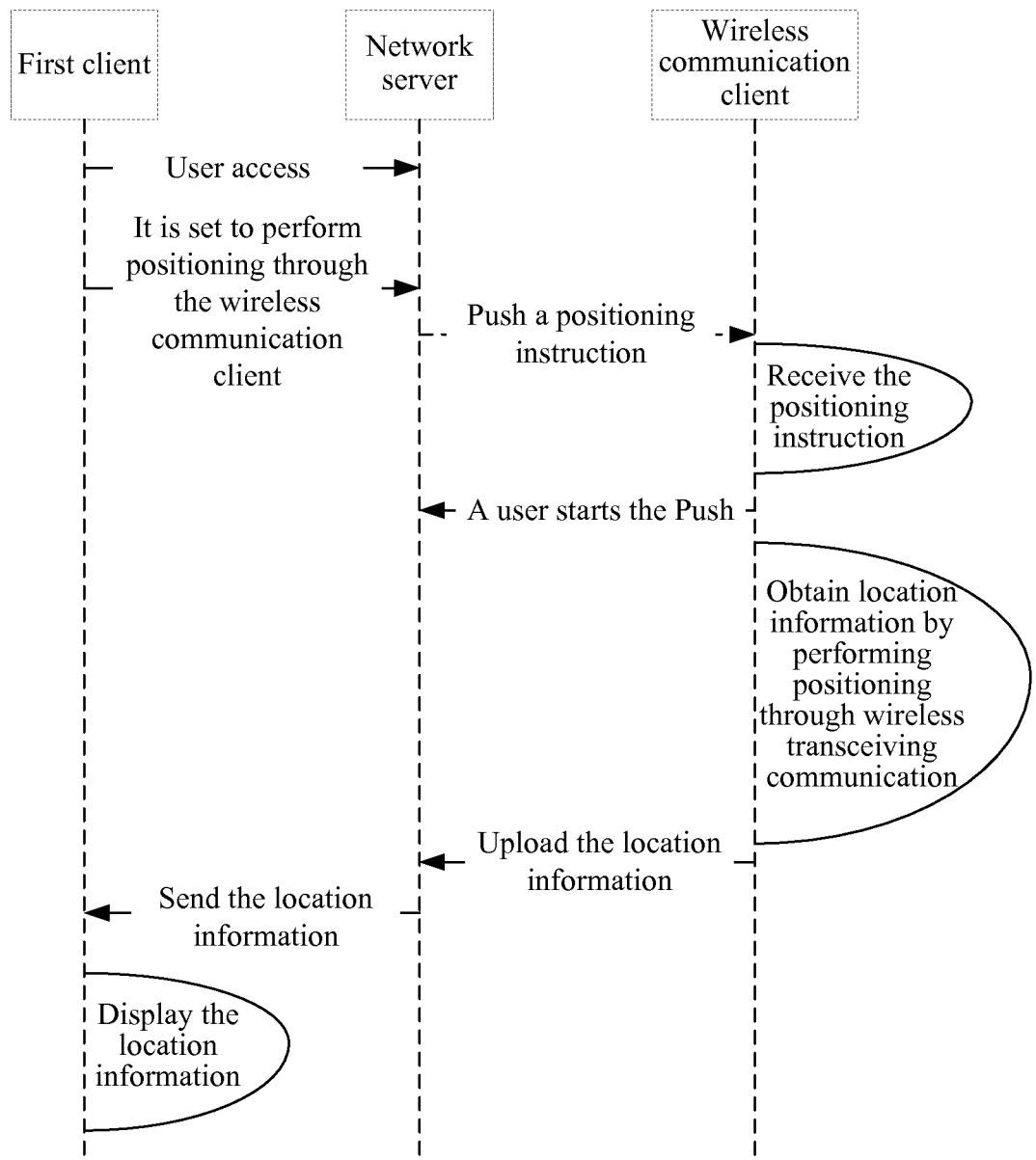
FIG. 6 is a sequence diagram of a method for acquiring location information according to an embodiment.

The following describes the method for acquiring location information in details with reference to a specific embodiment. In this embodiment, as shown in FIG. 6, the user initiates a request to the network server through the first client, and sets that the positioning manner of the location of the first client is implemented by the wireless communication client. In this case, a backend network server acquires the user identifier of the user in the first client and the accessed network address, generates the positioning instruction according to the user identifier and the network address and pushes the positioning instruction to the wireless communication client corresponding to the first client.

The wireless communication client performs positioning through the wireless transceiving communication to obtain the location information when receiving the positioning instruction, and returns the location information to the network server, so that the network server provides the location information for the user.

For example, if the user accesses a delicacy recommendation service based on the geographic location information through the first client, in this case, for the user, the distance between the recommended delicacy information and the current location of the user greatly influences the accuracy of the recommendation. According to the current position of the user, the delicacy close to the current position of the user is recommended to the user, which satisfies the intention of the user to access the delicacy recommendation service.

Figure 7:
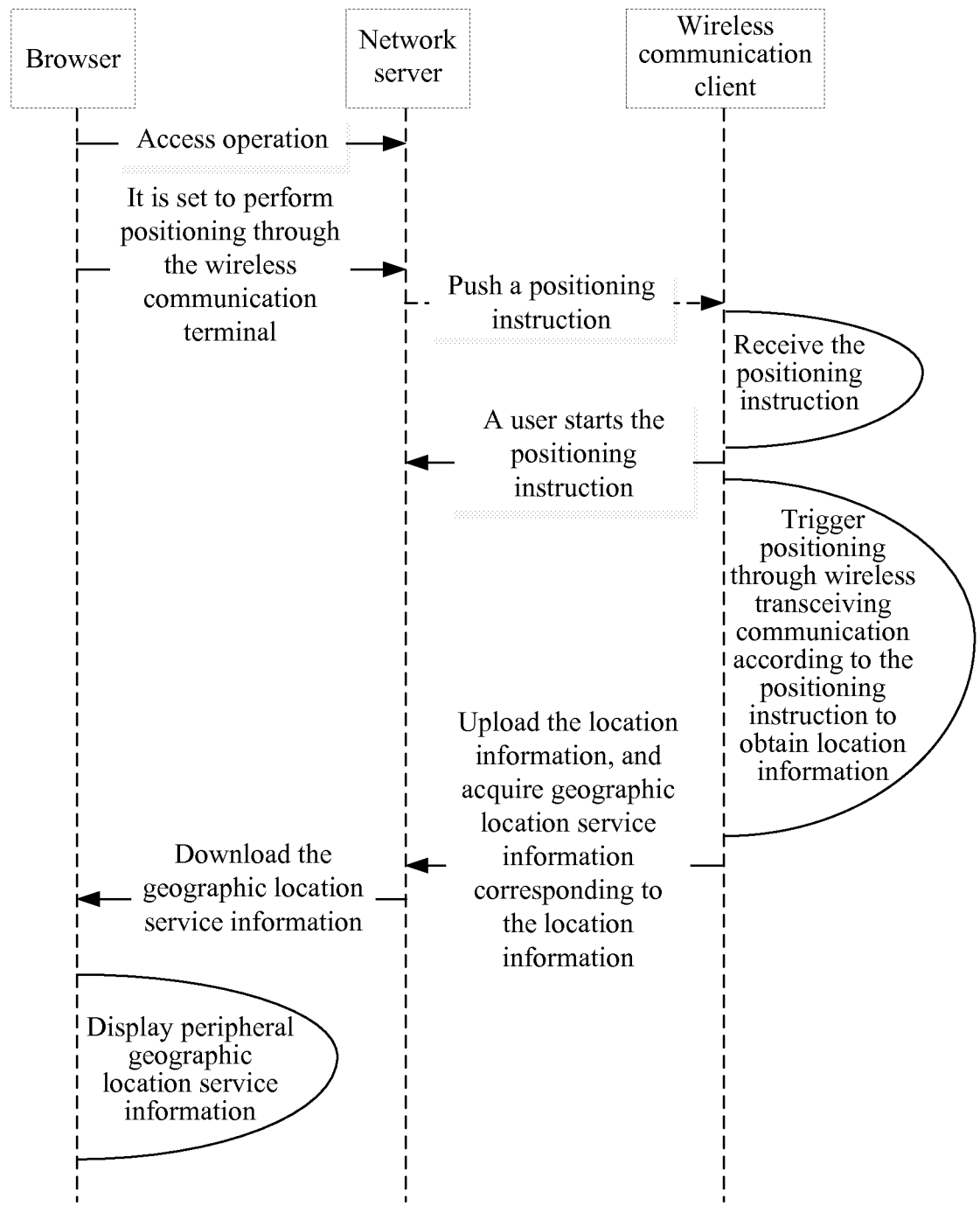
FIG. 7 is a sequence diagram of applying a method for acquiring location information according to an embodiment.

As shown in FIG. 7, the first client is a browser. The user accesses the delicacy recommendation service by loading a web page of the delicacy recommendation service in the browser, selects the wireless communication client to perform positioning in the web page, and initiates the wireless positioning request. In this case, the backend network server generates the positioning instruction according to the wireless positioning request, and pushes the positioning instruction to the wireless communication client according to the user identifier in a message-pushing manner.

After the wireless communication client receives the pushed positioning instruction, the user starts the pushed positioning instruction to trigger the wireless communication client to perform positioning, to obtain the location information and upload the location information to the network server.

The network server screens a large amount of delicacy information according to the location information, to obtain the delicacy information that matches the location information, so that the user can download the delicacy information and display it in the browser.

In the method for acquiring location information, due to the limitation of hardware, the processing capability of the wireless communication client is limited, and the wireless communication client cannot provide a richer geographic location service for the user. Therefore, the location service obtained through the positioning of the wireless communication client is applied in the first client, such as the PC, to display a richer geographic location service for the user, thereby greatly promoting the development of the network application based on the geographic location service.

Figure 8:
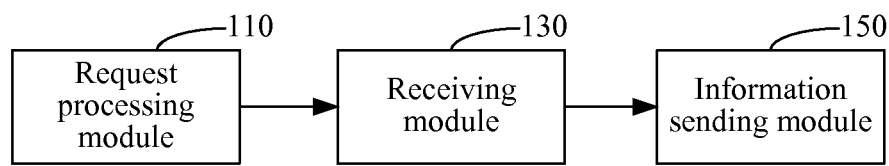
FIG. 8 is a schematic structural diagram of a system for acquiring location information according to an embodiment.

As shown in FIG. 8, in an embodiment, a system for acquiring location information includes a request processing module 110, a receiving module 130 and an information sending module 150.

The request processing module 110 is configured to generate a positioning instruction according to a wireless positioning request initiated by a first client, and push the positioning instruction to a wireless communication client corresponding to the first client.

In this embodiment, the first client is a client running in a fixed network terminal, and performs positioning through a network address. The fixed network terminal is a device, such as a PC, which implements network connection through a medium such as an optical fiber or a network cable. The first client may be a browser. The wireless communication client corresponding to the first client runs in a mobile terminal, and is a client having a wireless transceiving communication function, such as a smart phone.

The request processing module 110 receives the wireless positioning request initiated by the first client. In this case, it may be known according to the wireless positioning request that the first client requests for positioning through the wireless communication client, to generate the corresponding wireless positioning instruction, and actively sends the wireless positioning instruction to the wireless communication client.

Figure 9:
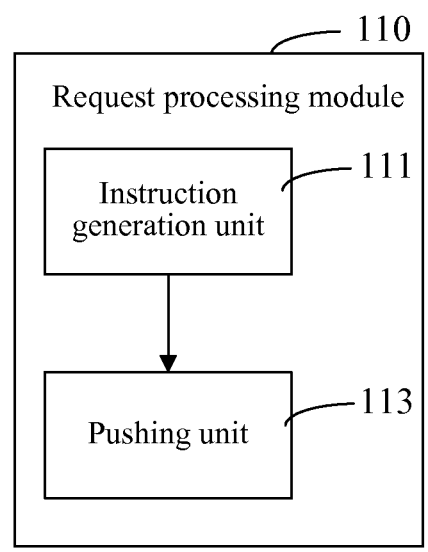
FIG. 9 is a schematic structural diagram of a request processing module in FIG. 8.

As shown in FIG. 9, in an embodiment, the request processing module 110 includes an instruction generation unit 111 and a pushing unit 113.

The instruction generation unit 111 is configured to acquire a user identifier and a network address accessed by the first client from the wireless positioning request initiated by the first client, and generate a positioning instruction according to the user identifier and the network address.

In this embodiment, the user identifier is used for uniquely identifying a user identity in the first client and the wireless communication client. The first client and the wireless communication client adopt a same user account system. The network address accessed by the first client is a storage address corresponding to page data loaded in the running first client, namely an IP address. The first client acquires the page data from a network server through the network address and loads the page data.

The pushing unit 113 is configured to push the positioning instruction to a wireless communication client corresponding to the same user identifier.

In this embodiment, the pushing unit 113 actively transmits the positioning instruction, so as to push the positioning instruction to a wireless communication terminal in which a user identifier is the same as the user identifier in the first client. Specifically, the user identifier corresponding to the first client initiating the wireless positioning request may be known according to the positioning instruction, so as to push the positioning instruction according to the user identifier.

Figure 10:
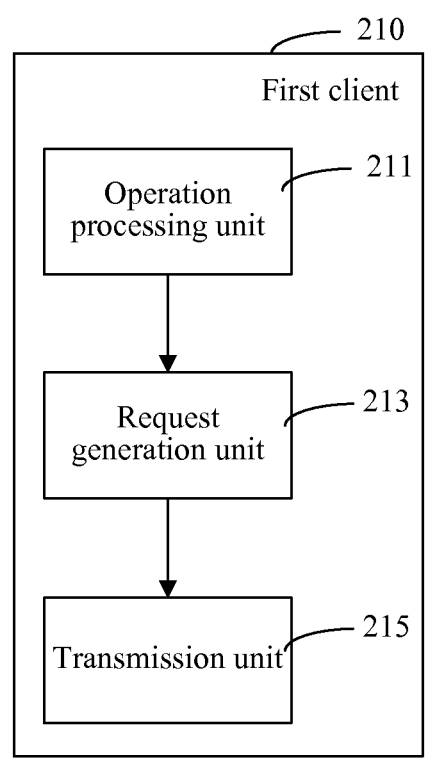
FIG. 10 is a schematic structural diagram of a first client according to an embodiment.

As shown in FIG. 10, in another embodiment, the system for acquiring location information further includes a first client 210. The first client 210 includes an operation processing unit 211, a request generation unit 213 and a transmission unit 215.

The operation processing unit 211 is configured to acquire an access operation, and obtain an identifier of a user triggering the access operation and an accessed network address according to the access operation.

In this embodiment, the access operation is a page access operation triggered by a user in the first client 210. For example, the user may acquire a user identifier corresponding to the user and a network address of a web page by accessing the web page in the first client 210.

The request generation unit 213 is configured to generate a wireless positioning request according to the user identifier and the network address.

The transmission unit 215 is configured to initiate the wireless positioning request according to the network address.

In this embodiment, the transmission unit 215 initiates the wireless positioning request to the network server storing the page data according to the network address, so as to request the network server to acquire location information of the user.

The receiving module 130 is configured to receive location information obtained when the wireless communication client performs positioning according to the positioning instruction.

In this embodiment, after the positioning instruction is pushed to the wireless communication client, the wireless communication client is triggered to perform positioning through wireless transceiving communication so as to obtain a current geographic location of the wireless communication client, generate corresponding location information and upload the location information to the network server.

Figure 11:
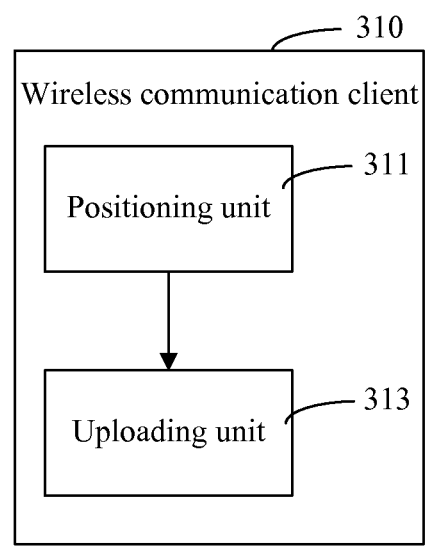
FIG. 11 is a schematic structural diagram of a wireless communication client according to an embodiment.

As shown in FIG. 11, in another embodiment, the system for acquiring location information further includes a wireless communication client 310. The wireless communication client 310 includes a positioning unit 311 and an uploading unit 313.

The positioning unit 311 is configured to trigger positioning through wireless transceiving communication according to the positioning instruction, to obtain location information thereof.

In this embodiment, the wireless transceiving communication function in the wireless communication client 310 may be implemented through a GPS or a radio communication network of a communication operator. After receiving the positioning instruction, the positioning unit 311 performs positioning through wireless transceiving communication to obtain the current geographic location, where the geographic location may include longitude and latitude in a coordinate format.

The uploading unit 313 is configured to extract a network address from the positioning instruction, and upload the location information according to the network address.

In this embodiment, after the location information of the wireless communication client 310 is obtained through positioning, the uploading unit 313 extracts the network address from the positioning instruction including the user identifier and the network address, so as to upload the location information to the network server according to the network address.

The information sending module 150 is configured to send the location information to the first client.

In this embodiment, when the network server receives the location information obtained through positioning of the wireless communication terminal, the information sending module 150 returns the location information to the first client 210 initiating the wireless positioning request, so that the user can view the location information conveniently.

In the system for acquiring location information, in a scenario where the user needs to acquire the current geographic location of the first client 210, the wireless communication terminal 310 performs positioning to obtain the accurate location information. For example, in a conventional scenario of querying the location of the user through the network address, the positioning instruction may be generated through the wireless positioning request initiated in the first client 210; and the network server pushes the positioning instruction to the wireless communication client 310 corresponding to the first client, to further trigger the wireless communication client 310 to perform positioning to obtain the location information, and returns the location information to the first client 210, so as to display a corresponding query result to the user. Therefore, the query result is accurate to longitude and latitude, which greatly improves the accuracy of the query.

In another embodiment, the system for acquiring location information further includes a geographic location service module.

The geographic location service module is configured to acquire geographic location service information corresponding to the location information, and store the geographic location service information according to the location information.

In this embodiment, the geographic location service module queries the network information according to the location information, to obtain the geographic location service information related to the location information, and stores the geographic location service information and the location information associatively, so that the user can conveniently request for accessing the geographic location service information of the location of the user.

The information sending module 150 is further configured to receive a download request initiated by the first client, and send the geographic location service information downloaded by the first client according to the download request.

In this embodiment, the user may trigger the download operation of the geographic location service information through the first client 210. In this case, the information sending module 150 initiates a download request to the network server storing the location information and the associative geographic location service information. After receiving the download request, the network server sends the geographic location service information to a computer, so that the user can view the geographic location service information conveniently.

In the system for acquiring location information, the carrier of the request processing module, the receiving module, the information sending module and the geographic location service module may be a network server. The acquisition of the location information is implemented through the interaction between the first client, the network server and the wireless communication client, and the system for acquiring location information can implement positioning under the function of the wireless communication client without depending on the browser, thereby improving the independence of the system and the smoothness of processing.

In the system for acquiring location information, due to the limitation of hardware, the processing capability of the wireless communication client is limited, and the wireless communication client cannot provide a richer geographic location service for the user. Therefore, the location service obtained through the positioning of the wireless communication client is applied in the first client, such as the PC, to display a richer geographic location service for the user, thereby greatly promoting the development of the network application based on the geographic location service.

In the method and the system for acquiring location information, the positioning instruction is generated according to the wireless positioning request initiated in the first client, so that the wireless communication client performs positioning to obtain the location information after receiving the pushed positioning instruction, and the geographic location of the user can be known according to the location information. Because the location information is obtained through the positioning of the wireless communication client, the accuracy thereof is much higher than that of the location information obtained according to the network address, thereby greatly improving the accuracy.

As noted above, a method of determining the location of a first client using the location of a wireless communication client (e.g., a mobile phone) is disclosed herein if the two clients are adjacent to each other. An important aspect of this method is that it leverages the more accurate positioning capability of the wireless communication client for locating the first client based on their proximity. As will be described below, there are many applications of the method in today's world since more and more people are carrying with them a smartphone that can be accurately positioned using, e.g., the GPS module in the smartphone or wireless triangulation methods supported by the wireless network coupled to the smartphone.

Figure 12:
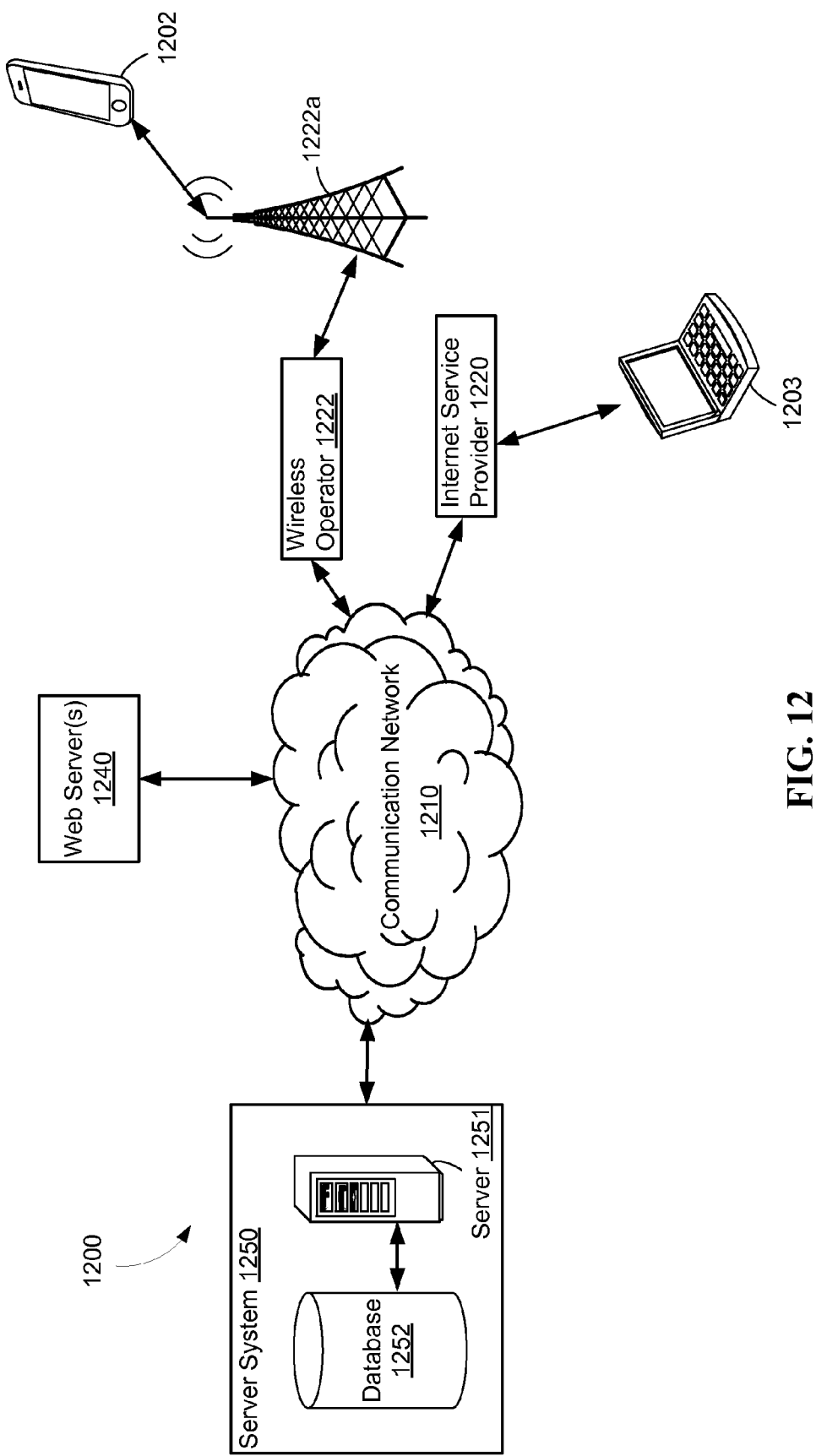
FIG. 12 is a block diagram of a network environment including a server system and a plurality of client devices coupled to the server system according to some embodiments of the present invention.

FIG. 12 is a block diagram of a network environment 1200 including a server system 1250 and a plurality of client devices 1202 and 1203 coupled to the server system 1250 according to some embodiments of the present invention. As shown in the figure, the first client is a laptop 1203 that is coupled to the communication network 1210 (e.g., the Internet) through an Internet service provider 1220. A user of the laptop 1203 can access the server system 1250 through the communication network 1210 and receive services supported by the server system 1250. For example, the user can send a search query to the server system 1250, the search query including one or more search keywords, and receive search results from the server system 1250. Meanwhile, the user carries a smartphone 1202 that is wirelessly coupled to a base station 1222*a* adjacent the smartphone. The user can use the data or voice service provided by the wireless operator 1222 through its wireless network including the base station 1222*a* as well as the communication network 1210. For example, the user can access a website hosted by a web server 1240 from the smartphone 1202.

Within the server system 1250, there is a server computer 1251 for receiving and processing data received from the client devices or the web servers 1240. For example, in response to the search query from the laptop 1203, the server computer 1251 queries the database 1252 for information matching the search query. Sometimes, the server system 1250 may send a separate data request (which could be another search query) to another server system, e.g., a web server 1240, for information related to the search query and then return a set of search results to the client devices using the search results returned by the database 1252 or the web server 1240 or both.

In some implementations, the server system 1250 may need information from both the laptop 1203 and the smartphone 1202 in order to provide satisfactory service to a user. For example, the user may submit a search request from the laptop 1203 to look for stores (e.g., restaurants) near the user's current location. There are at least two ways for the server system 1250 to determine the user's current location without requesting the user to provide such information expressly. For example, the server system 1250 may identify an IP address associated with the laptop 1203 in a search request from the laptop and then determine the current location of the laptop 1203 using the identified IP address. Alternatively, the server system may identify a wireless communication client (the smartphone 1202 in this case) associated with the user and submit a location request to the smartphone 1202 or the wireless operator 1222 for a current location of the smartphone 1202. Note that the location information associated with the smartphone 1202 is usually more accurate than the location information based on the laptop's IP address. Using the location information of the smartphone 1202, the server system 1250 can identify a set of stores based on their proximity to the smartphone 1202 and return them to the laptop 1203. In some implementations, the server system 1250 may identify a set of stores using the IP address-based location information and then reorder the set of stores by the he location information of the smartphone 1202.

To determine the current location information of the smartphone 1202, the server system 1250 needs to have the identity of the smartphone 1202. In some implementations, the identity of the smartphone 1202 is provided to the server by the user of the laptop 1203 (e.g., by entering the phone number of the smartphone at the laptop 1203). In some other implementations, the server system 1250 receives the identity of the smartphone 1202 from a corresponding user account at the server system 1250. To do so, the server system 1250 needs to first determine an identifier of the user account. In some implementations, the search request from the laptop 1203 includes an identifier of the user account at the server system 1250. For example, the user of the laptop 1203 logs into his/her user account before the user sends the search request. In this case, the search request may have the user's identity information (e.g., an encrypted pair of username and password) or an identifier of a current session generated by the server system 1250 for the user at the laptop 1203 or a unique key (e.g., a 2D QR code) that can be associated with the smartphone 1202. Using the identity information or session identifier or unique key, the server system 1250 looks up the user account information in the database 1252 for the smartphone 1202. For example, the user may have registered his/her mobile devices (e.g., the smartphone 1202) with the server system 1250 previously by providing a unique identifier of the smartphone 1202 (e.g., a phone number) to the server system 1250.

Using the user account identifier in the search request, the server system 1250 receives the identifier of the smartphone 1202 from the database 1252 and then determines the current location of the smartphone 1202. In some implementations, the server system 1250 may send a location request including the identifier of the smartphone 1202 to a wireless service carrier (e.g., the wireless operator 1222), which may be in the form of one or more server computers. In response to the location request, the wireless service carrier may forward the request to the mobile device directly and using the identifier. For example, the location request may be submitted to a GPS module of the smartphone 1202 (not shown in FIG. 12) for receiving its current location. The GPS module then returns the current location information to the wireless service carrier and ultimately the server system 1250. Alternatively, the wireless service carrier may determine the current location of the mobile device using other positioning technologies (e.g., assisted GPS, wireless triangulation or Wi-Fi based indoor positioning technologies) if, e.g., the wireless device does not have a GPS module, or the GPS module in the wireless device has been turned off or if there is no reliable GPS signal at the current location of the mobile device (e.g., the mobile device may be located inside a building).

As noted above, the server system 1250 uses the determined current location information of the mobile device to identify a set of search results, e.g., restaurants, adjacent the user and returns them to be displayed on the laptop 1203. In some implementations, if there is already an identified set of search results based on the IP address-based location information, the server system 1250 may use the current location information of the mobile device to reorder them based at least in part on their respective distances from the current location. Before doing so, the server system 1250 may verify the accuracy of the current location information of the mobile device by comparing it with the IP address-based location information. For example, the server system 1250 may determine not to use the current location information of the mobile device if the difference between the two types of location information is more than a predefined threshold (e.g., one mile). In other words, the mobile device registered with the user account at the server system 1250 may not currently be with the user. In this case, the server system 1250 only relies upon the IP address-based location information for determining the search results. In some implementations, a user can register multiple mobile devices with his/her user account at the server system 1250. The server system 1250 compares their respective current locations with respect to the IP address-based location and only uses a mobile device (e.g., the smartphone 1202 that the user carries for most of the time) whose current location is deemed to be closest to the IP address-based location for determining the search results.

In some implementations, the server system 1250 shifts the responsibility of identifying search results based on the current location of the user to the laptop 1203. In this case, the server system 1250 determines the IP address-based location information of the laptop 1203 or the current location of the mobile device or both and returns them to the laptop 1203. Upon receipt of the two types of location information, the laptop 1203 submits a search query to a remote web server 1240 (e.g., a search engine) for stores near the laptop, the search query including the user-provided search terms (e.g., "pizza" or "Chinese food") and at least one type of location information. In some implementations, the server system 1250 returns the two types of location information to the laptop 1203 separately. For example, the IP address-based location information may be returned before the current location information of the mobile device. In this case, the laptop 1203 may use the IP address-based location information in the search query for receiving an initial set of search results (including their respective location information) and then use the subsequently-received more accurate location information of the mobile device (e.g., the smartphone 1202) for reordering the search results. But before doing that, the laptop 1203 may compare the difference between the two types of location information and determine the accuracy of the location information of the mobile device. For example, if the two types of location information are more than one mile from each other (e.g., the user may have left his/her smartphone at home), there should be no re-ordering of the search results. Finally, the laptop 1203 displays the search results to the user based at least in part on their respective distance to the determined location of the user.

Figure 13:
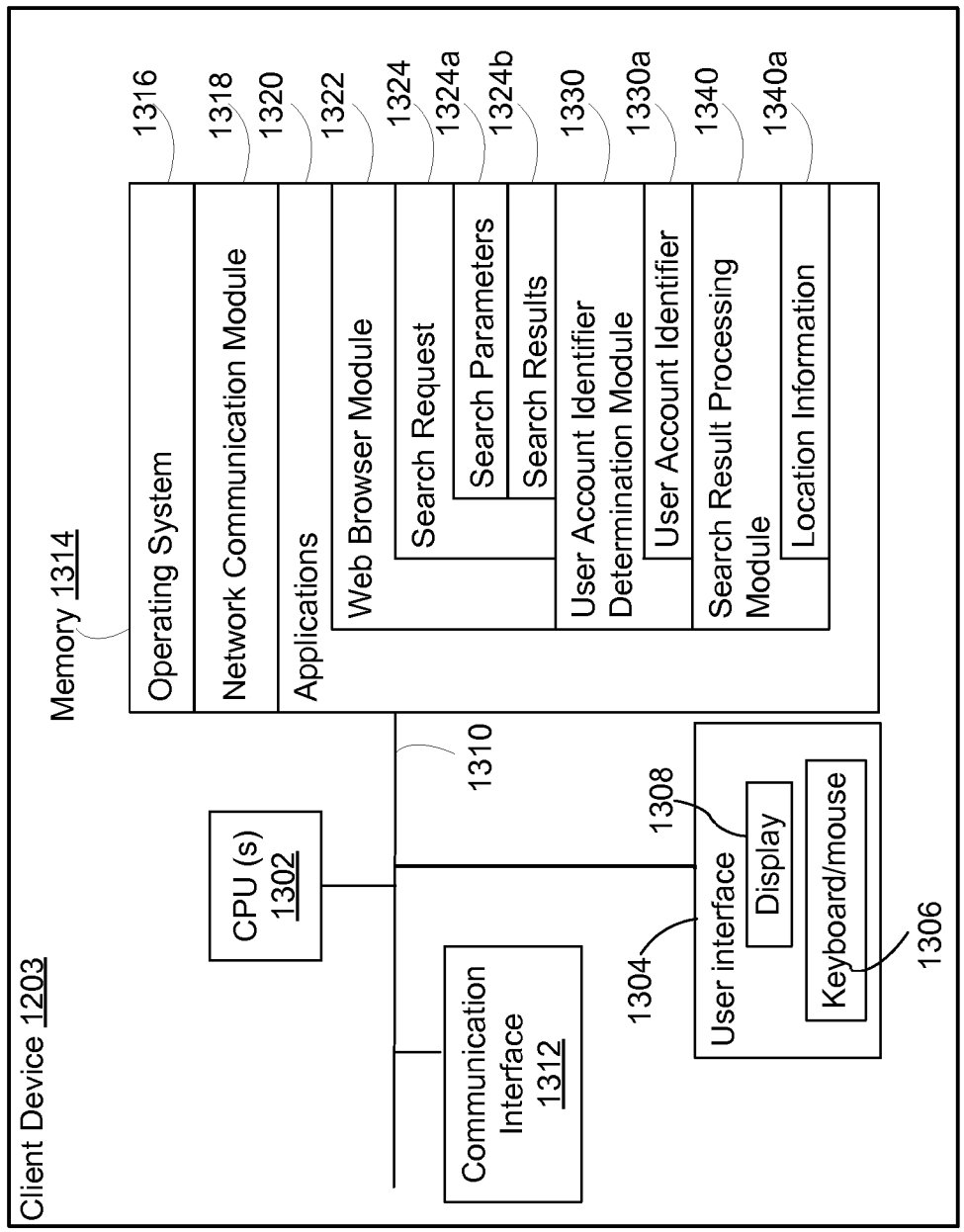
FIG. 13 is a block diagram of a client device according to some embodiments of the present invention.

FIG. 13 is a diagram of an example implementation of a client device 1203 (e.g., laptop), discussed above with reference to FIG. 12. While certain specific features are illustrated, those skilled in the art will appreciate from the present disclosure that various other features have not been illustrated for the sake of brevity and so as not to obscure more pertinent aspects of the implementations disclosed herein. To that end, the client device 1203 includes one or more processing units (CPU's) 1302, one or more network or other communications interfaces 1312, a user interface 1304 including a display 1308 and keyboard/mouse 1306, memory 1314, and one or more communication buses 1310 for interconnecting these and various other components. The communication buses 1310 may include circuitry (sometimes called a chipset) that interconnects and controls communications between different components. The memory 1314 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1314 may optionally include one or more storage devices remotely located from the CPU(s) 1302. The memory 1314, including the non-volatile and volatile memory device(s) within the memory 1314, comprises a non-transitory computer readable storage medium.

In some implementations, the memory 1314 or the non-transitory computer readable storage medium of the memory 1314 stores the following programs, modules and data structures, or a subset thereof including an operating system 1316, a network communication module 1318, and one or more applications 1320. The operating system 1316 includes procedures for handling various basic system services and for performing hardware dependent tasks. The network communication module 1318 facilitates communication with other devices via the one or more communication network interfaces 1312 (wired or wireless) and one or more communication networks, such as the Internet, other wide area networks, local area networks, metropolitan area networks, and so on.

The applications 1320 include a web browser module 1322 for receiving a search request 1324, including a plurality of search parameters 1324*a*, from a user of the client device 1203 and one or more search results 1324*b* associated with the search result. In some implementations, the search parameters 1324*a* include one or more search keywords and a unique identifier corresponding to a user account at the server system 1250 for identifying the mobile device associated with the current user of the client device 1203. The applications 1320 also include a user account identifier determination module 1330 that further includes a user account identifier 1330a to be provided to the search request 1324. In some implementations, the user account identifier determination module 1330 receives the user account identifier 1330a from another application on the client device 1203 after the user logs into his/her user account at the remote server system 1250 through the application. The applications 1320 also include a search result processing module 1340 for processing the search results returned from a remote server (which may be the server system 1250 or a search engine) using the stored location information 1340a. As noted above, the IP address-based search results may be reordered by the current location of a mobile device (e.g., the smartphone 1202) adjacent the client device. This re-ordering process may be performed by the search result processing module 1340 at the client device 1203.

Figure 14:
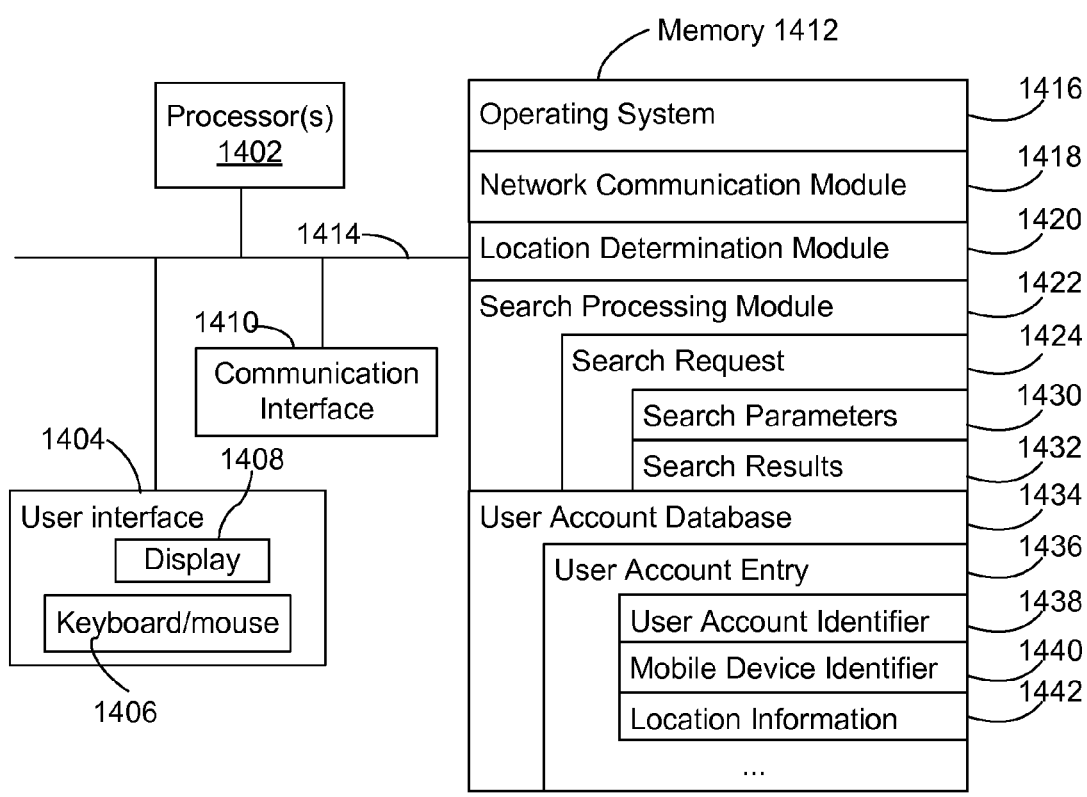
FIG. 14 is a block diagram of a server system according to some embodiments of the present invention.

FIG. 14 is a block diagram of different components in the server system 1250 according to some embodiments of the present invention. The server system 1250 includes memory 1412; one or more processors 1402 for executing modules, programs and/or instructions stored in the memory 1412 and thereby performing predefined operations; one or more network or other communications interfaces 1410; and one or more communication buses 1414 for interconnecting these components. In some implementations, the server system 1250 includes an optional user interface 1404 comprising a display device 1408 and one or more input devices 1406 (e.g., keyboard or mouse). In some implementations, the memory 1412 includes high-speed random access memory, such as DRAM, SRAM, or other random access solid state memory devices. In some implementations, memory 1412 includes non-volatile memory, such as one or more magnetic disk storage devices, optical disk storage devices, flash memory devices, or other non-volatile solid state storage devices. In some implementations, memory 1412 includes one or more storage devices remotely located from the processor(s) 1402. Memory 1412, or alternately one or more storage devices (e.g., one or more nonvolatile storage devices) within memory 1412, includes a non-transitory computer readable storage medium. In some implementations, memory 1412 or the computer readable storage medium of memory 1412 stores the following programs, modules and data structures, or a subset thereof:

- an operating system 1416 that includes procedures for handling various basic system services and for performing hardware dependent tasks;
- a network communications module 1418 that is used for connecting the server system 1250 to other computers (e.g., the client devices 1202/1203 in FIG. 12) via the communication network interfaces 1410 and one or more communication networks (wired or wireless), such as the communication network 1210 in FIG. 12, other wide area networks, local area networks, metropolitan area networks, etc.;
- a location determination module 1420 for determining the two types of location information for a client device: (i) the IP address-based location information and (ii) the current location information of a mobile device associated with a user account at the server system 1250;
- a search processing module 1422 for receiving a search request 1424 from the client device, the search request 1424 including one or more search parameters 1430 and a plurality of search results 1432 associated with the search request 1424; and
- a user account database 1434 including a plurality of user account entries, each user account entry 1436 including a user account identifier 1438 for uniquely identifying a user of the server system 1250 (in some implementations, the user account identifier 1438 includes a session identifier representing the current session of the user), a mobile device identifier 1440 for uniquely identifying a mobile device such as a smartphone associated with the user (in some implementations, the mobile device identifier includes certain mobile device information, e.g., the model number of the device, which can be used by the server system 1250 for deciding on how to determine the current location of the device, e.g., using its GPS module or the wireless triangulation method provided by the wireless service carrier), and one or two types of location information 1442 associated with the mobile device.

In some implementations, the location determination module 1420 provides both type of location information to the search processing module 1422. The search processing module 1422 then first determines a set of search results using the IP address-based location information and then reorders them using the current location of the mobile device identified by the mobile device identifier 1440. In some other implementations, the search processing module 1422 returns the initial set of search results based on the IP address-based location information and the current location information of the mobile device to the corresponding client device so that the client device performs the re-ordering operation.

It should be noted that the modules, databases, and models in the server system 1250 describe above in connection with FIG. 14 may be implemented on a single computer server or distributed among multiple computer servers that are connected by a computer network. Although a specific hardware configuration may affect the performance of the server system 1250, the implementation of the present application is not dependent on a particular hardware configuration.

Persons of ordinary skill in the art may understand that all or a part of the flow of the method according to the embodiments may be implemented by a computer program instructing relevant hardware. The program may be stored in a computer readable storage medium. When the program is run, the flow of the embodiment of the foregoing method may be included. The storage medium may be a magnetic disk, an optical disk, a read-only memory (ROM) or a random access memory (RAM) and the like.

The foregoing embodiments merely describe some implementation manners of the present invention, and the description thereof is specific and detailed, but should not be construed as the limitation to the protection scope of the present invention. It should be noted that, persons of ordinary skills in the art may also make variations and modifications without departing from the idea of the present invention, which all belong to the protection scope of the present invention. Therefore, the protection scope of the present invention shall be subjected to the appended claims.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for acquiring location information, comprising:
    at a server having memory and one or more processors:
        receiving a wireless positioning request initiated by a first client running on a client device, wherein the wireless positioning request includes a user-specified positioning manner of a location of the first client to be implemented by a wireless communication client running on a mobile terminal, a user identifier shared by the first client and the wireless communication client, and a network address identifying the client device;
        acquiring the user identifier and the network address from the wireless positioning request initiated by the first client;
        generating a positioning instruction according to the user identifier and the network address a wireless positioning request initiated by a first client;
        pushing the positioning instruction to the wireless communication client corresponding to the first client, wherein the mobile terminal is adjacent to the client device;
        receiving, from the mobile terminal, location information obtained when the wireless communication client running on the mobile terminal performs positioning according to the positioning instruction using the user-specified positioning manner;
        sending the location information and a plurality of search results associated with the location information to the first client; and
        receiving a download request initiated by the first client, and sending geographic location service information corresponding to the location information to the first client according to the download request.

2. The method for acquiring location information according to claim 1, wherein the step of receiving, from the mobile terminal, location information obtained when the wireless communication client running on the mobile terminal performs positioning according to the positioning instruction using the user-specified positioning manner comprises:
    triggering positioning through wireless transceiving communication according to the positioning instruction using the user-specified positioning manner, to obtain location information of the wireless communication client; and
    extracting the network address from the positioning instruction, and uploading the location information according to the network address.

3. The method for acquiring location information according to claim 1, wherein after the step of receiving, from the mobile terminal, location information obtained when the wireless communication client running on the mobile terminal performs positioning according to the positioning instruction using the user-specified positioning manner, the method further comprises:
    acquiring the geographic location service information corresponding to the location information, and storing the geographic location service information according to the location information.

4. A system for acquiring location information including one or more processors, memory and a plurality of processing units, the plurality of processing units further comprising:
    a request processing module, configured to receive a wireless positioning request initiated by a first client running on a client device, wherein the wireless positioning request includes a user-specified positioning manner of a location of the first client to be implemented by a wireless communication client running on a mobile terminal, a user identifier shared by the first client and the wireless communication client, and a network address identifying the client device;

an instruction generation unit, configured to acquire the user identifier and the network address from the wireless positioning request initiated by the first client, and generate a positioning instruction according to the user identifier and the network address; a wireless positioning request initiated by a first client, and a pushing unit, configured to push the positioning instruction to a wireless communication client corresponding to the first client, wherein the mobile terminal is adjacent to the client device;

a receiving module, configured to receive, from the mobile terminal, location information obtained when the wireless communication client running on the mobile terminal performs positioning according to the positioning instruction using the user-specified positioning manner; and an information sending module, configured to send the location information and a plurality of search results associated with the location information to the first client and send geographic location service information corresponding to the location information to the first client in response to receiving a download request initiated by the first client.

5. The system for acquiring location information according to claim 4, further comprising the wireless communication client, wherein the wireless communication client comprises:
    a positioning unit, configured to trigger positioning through wireless transceiving communication according to the positioning instruction using the user-specified positioning manner, to obtain location information thereof; and
    an uploading unit, configured to extract the network address from the positioning instruction, and upload the location information according to the network address.

6. The system for acquiring location information according to claim 4, further comprising:
    a geographic location service module, configured to acquire geographic location service information corresponding to the location information, and store the geographic location service information according to the location information.

7. A method for providing location-based information, comprising:
at a server having one or more processors and memory:
    receiving a search request from a client device, the search request including one or more search keywords, a user-specified positioning manner of a location of the client device to be implemented by a wireless communication client running on a mobile device, and an IP address of the client device;
    identifying a user account identifier associated with the search request, wherein the user account identifier is shared by a first client running on the client device and the wireless communication client running on the mobile device;
    determining location information of the mobile device associated with the user account identifier according to the user account identifier and the IP address of the client device and using the user-specified positioning manner, wherein the mobile device is located near the client device;
    identifying a plurality of search results in accordance with the search keywords and the location information;
    returning the plurality of search results to the client device for display; and
    receiving a download request initiated by the client device, and sending geographic location service information corresponding to the location information to the client device according to the download request.

8. The method according to claim 7, wherein determining location information of the mobile device further includes:
    sending a location request to the mobile device; and
    receiving the location information of the mobile device from the mobile device.

9. The method according to claim 7, wherein determining location information of the mobile device further includes:
    sending a location request to a wireless service carrier associated with the mobile device, the location request including a device identifier of the mobile device; and
    receiving the location information of the mobile device from the wireless service carrier.

10. The method according to claim 7, wherein identifying a plurality of search results further includes:
    determining first location information of the client device based on the IP address of the client device;
    identifying a first set of search results in accordance with the search keywords and the first location information; and
    reordering the first set of search results by the location information of the mobile device.

11. A method for receiving location-based information, comprising:
at a client device having one or more processors and memory:
    sending a search request to a remote server, the search request including one or more search keywords, a user-specified positioning manner of a location of the client device to be implemented by a wireless communication client running on a mobile device, an IP address of the client device, and a user account identifier shared by a first client running on the client device and the wireless communication client running on the mobile device;
    receiving a plurality of search results from the remote server, wherein the search results are ordered on the remote server by location information of the mobile device located near the client device and associated with the user account identifier, the location information of the mobile device is received by the remote server according to the user account identifier and the IP address of the client device and using the user-specified positioning manner;
    sending a download request to the remote server, and receiving geographic location service information corresponding to the location information from the remote server; and
    displaying at least a subset of the reordered search results and the geographic location service information on the client device.

12. The method according to claim 11, wherein the remote server is configured to:
    determine first location information of the client device based on the IP address of the client device;
    identify a set of search results in accordance with the search keywords and the first location information; and reorder the first set of search results by the location information of the mobile device.

13. A method for receiving location-based information, comprising:

at a client device having one or more processors and memory:

sending a search request to a remote server, the search request including one or more search keywords, a user-specified positioning manner of a location of the client device to be implemented by a wireless communication client running on a mobile device, a first location information of the client device, and a user account identifier shared by a first client running on the client device and the wireless communication client running on the mobile device;

receiving a plurality of search results from the remote server, wherein the search results are ordered by the first location information of the client device;

determining second location information of the client device based on location information of the mobile device located near the client device, wherein the location information of the mobile device is received from the remote server according to the user account identification and the first location information of the client device and using the user-specified positioning manner;

sending a download request to the remote server, and receiving geographic location service information corresponding to the location information from the remote server; and reordering the plurality of search results by the second location information; and displaying at least a subset of the reordered search results and the geographic location service information on the client device.

14. The method according to claim 13, wherein the first location information of the client device is determined based an IP address of the client device.

15. A server system for providing location-based information, comprising:

one or more processors;

memory; and one or more program modules stored in the memory and to be executed by the one or more processors, the program modules including instructions for:

receiving a search request from a client device, the search request including-one or more search keywords, a user-specified positioning manner of a location of the client device to be implemented by a wireless communication client running on a mobile device, and an IP address of the client device;

identifying a user account identifier associated with the search request, wherein the user account identifier is shared by a first client running on the client device and the wireless communication client running on the mobile device;

determining location information of the mobile device associated with the user account identifier according to the user account identifier and the IP address of the client device and using the user-specified positioning manner, wherein the mobile device is located near the client device;

identifying a plurality of search results in accordance with the search keywords and the location information;

returning the plurality of search results to the client device for display; and receiving a download request initiated by the first client, and sending geographic location service information corresponding to the location information to the first client according to the download request.

* * * * *